Oct. 25, 1960  W. A. RAY  2,957,518
CONTROL DEVICE FOR FLOW OF FLUIDS
Filed Feb. 2, 1956  2 Sheets-Sheet 1
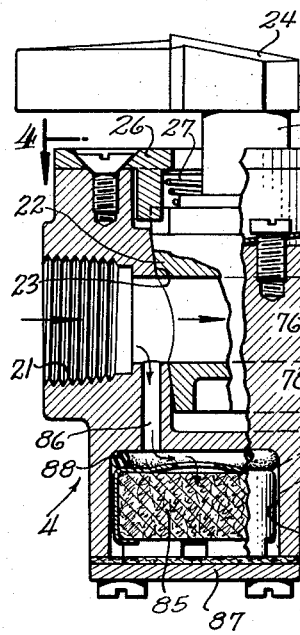
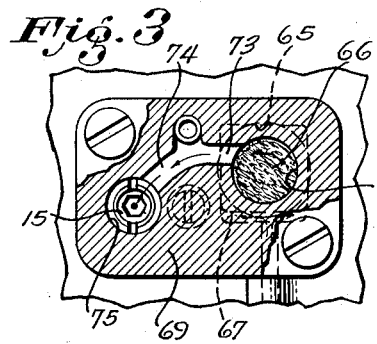
INVENTOR,
WILLIAM A. RAY
BY
Flann and Flann
ATTORNEYS.

Oct. 25, 1960 — W. A. RAY — 2,957,518
CONTROL DEVICE FOR FLOW OF FLUIDS
Filed Feb. 2, 1956 — 2 Sheets-Sheet 2

INVENTOR,
WILLIAM A. RAY
BY Flam and Flam
ATTORNEYS.

2,957,518
CONTROL DEVICE FOR FLOW OF FLUIDS

William A. Ray, North Hollywood, Calif., assignor to General Controls Co., a corporation of California Filed Feb. 2, 1956, Ser. No. 563,105

2 Claims. (Cl. 158—129)

This invention relates to valve structures, and particularly such structures utilized for controlling the flow of gaseous fuel to a burner.

It has been common to provide an automatic valve of the diaphragm type, for interrupting the flow of fuel upon extinguishing of the pilot flame for a main burner. It has also been common to provide a regulator valve that determines the gas pressure supplied to the burner, as well as a manual shut-off valve.

It is one of the objects of this invention to provide a simple and compact device that performs the functions of all three of these valves.

It is another object of this invention to arrange the gas regulator in such manner that any gas leakage past the regulator diaphragm is burned by the pilot flame, and is prevented from passing to the atmosphere while the pilot flame is extinguished. In this way, safe conditions are ensured.

It is still another object of this invention to make it possible to keep the regulator valve in operative open position even when the safety valve is closed.

It is still another object of this invention to provide an improved filter device for the gas to eliminate foreign material carried by the gas.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a vertical sectional view, taken along a plane corresponding to line 1—1 of Fig. 4;

Fig. 2 is a sectional view, taken along a plane corresponding to line 2—2 of Fig. 1;

Fig. 3 is a sectional view, taken along a plane corresponding to line 3—3 of Fig. 1;

Figure 5:
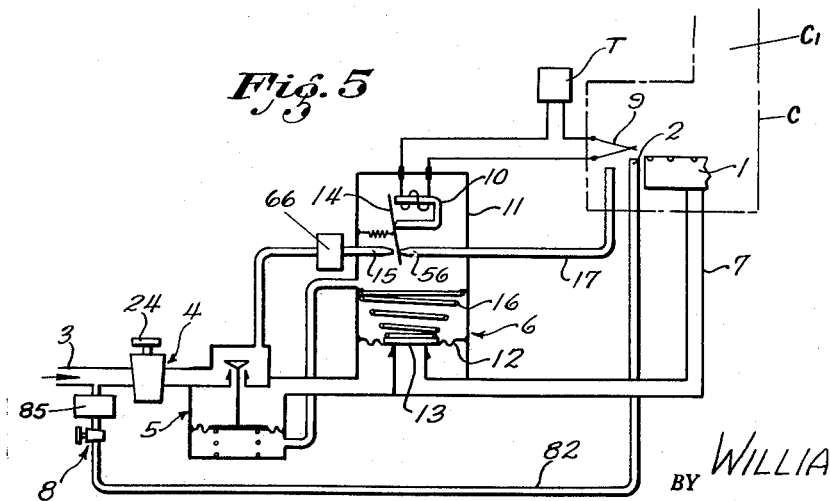
Fig. 5 is a diagram of a system in which the invention is utilized.

In the present instance, the control device is utilized in connection with a main gas burner 1 having a pilot burner 2 (Fig. 5). The fuel fed to the main burner 1 proceeds through a main supply conduit 3 in which are arranged in tandem a shut-off plug valve 4, a pressure regulator valve 5, and a valve 6. This valve may operate in response to heat requirements, as well as a safety valve. The outlet of this valve 6 includes a conduit 7 leading directly to the burner 1.

The functions of the three valves 4, 5 and 6 are well-known. The plug valve 4 can be operated manually to shut down the burner 1. The regulator valve 5 serves to reduce the gas pressure to a desired value before passing the gaseous fuel through the safety valve 6.

The pilot burner 2 is adapted to be supplied through a pilot burner valve 8 which can be in the form of a small plug valve. This connects via a filter 85 to the conduit 3 upstream from the valves 4, 5 and 6.

The flame from the pilot burner 2 serves to heat a thermocouple 9 which serves, when the pilot flame is in existence, to generate electrical energy for operation of an electromagnet 10 enclosed in a sealed chamber 11. The lower end of this sealed chamber is formed by a movable wall, such as a diaphragm 12, carrying the safety valve closure 13. A thermostat T may be included in the circuit of the electromagnet 10.

When the pilot flame is not in existence or when thermostat T is open, the armature 14 of the electromagnet 10 is in the unenergized position, opening the jet 15 connected to the conduit 3 via a filter 66. Accordingly, inlet gas pressure is effective on the upper side of the diaphragm 12 to urge the closure 13 to the closed position. A spring 16 assists this gas pressure to overcome the pressure acting on the lower side of the diaphragm 12 which urges the closure 13 to open position.

When the pilot flame is in existence, and thermostat T is closed, the armature 14 closes the jet 15 and the chamber 11 is vented through a conduit 17. This conduit leads to a place near the pilot burner 2 so that the gaseous fuel purged from chamber 11 will be consumed by the pilot flame. The combustion chamber C in which the burner 1 is located has a chimney or stack $C_1$ to carry off the products of combustion.

Thus, when the chamber 11 is vented, the pressure of the fuel beneath the diaphragm 12 serves to urge the diaphragm 12 upwardly and to open the valve 6.

Upon failure of the pilot flame or extinguishing of it for any reason, the valve 6 closes as hereinabove described.

In the present instance, all three valves 4, 5 and 6 are embodied in a common structure. Thus, there is a valve body 18 which is preferably made by die casting. It has a wide opening 19 at the top, and a relatively large opening 20 at the bottom of the body. These openings are sealed as hereinafter described.

The inlet conduit 3 is arranged to be connected to the valve body by the aid of the pipe threads 21 (Fig. 1) leading to the plug valve 4. This plug valve 4 is provided with a plug 22 arranged in a tapered plug seat 23 formed transversely of the body 18. A manually operable handle 24 fixed to the stem 25 of the plug 22 serves to rotate the plug 22 between open and closed positions. A retainer plate 26 is attached to the upper surface of the body 18 for confining the plug 22 against removal. It is resiliently held in its seat as by the aid of a compression spring 27.

The outlet side of the plug valve structure 4 is connected to a port 28 (Fig. 1) in body 18 leading to the regulator valve structure. This regulator valve structure includes a valve seat 29 formed on a member 30 which is threaded into the body 18 and to which access may be had by way of the opening 20 in the body 18. This member 30 defines the inlet to the regulator valve structure.

Valve seat 29 cooperates with a closure 31 shown in the present instance as conical in form and having a stem 32 extending downwardly through the member 30. In the inactive position illustrated, the upper surface of the closure 31 is urged against an abutment 33 carried by the valve body 18 as by the aid of a compression spring 34. This compression spring 34 operates upon a diaphragm 35 which seals the opening 20, and which is held in place by a cover 36. The upper end of the spring 34 engages the lower surface of a dished disk 37 attached to the lower surface of the diaphragm 35. The upper surface of the diaphragm 35 carries a similar dished disk 38. The assembly is held in place against the flange 39 carried by the stem 32, by a nut 40.

The lower end of the spring 34 engages the upper surface of an adjusting screw 41 which is threaded into a threaded aperture 42 of cover member 36. This screw 41 has a tapered guiding extension 43 at the lower end of spring 34. By the aid of screw 41, the force of the spring 34 may be adjusted, and accordingly the throttling position of closure 31 is affected; and the pressure of the gas passing through the member 30 is correspondingly regulated.

A screw 44 threaded into the same aperture 42 serves to seal the aperture 42 as by the aid of the gasket 45.

Immediately below the upper opening 19 of the valve body 18 there is a valve seat 46. This valve seat defines an inlet to the port 49 leading to the outlet of the valve. It is formed in an elbow joined to the sloping wall 47 on the casing 18. A boss 48 on the external wall of body 18 has an internal threaded connection for the conduit 7 illustrated in Fig. 5. Since there is a clear space, such as indicated by reference character 48' in Fig. 4, around the seat 46, gaseous fuel proceeding from above the diaphragm 35 of the regulator valve can find its way through the inlet leading to the port opening 49 on the valve structure 6. This flow of fuel is indicated by the dotted arrows 50 and 51.

Cooperating with the valve seat 56 is a resilient closure member 13 carried by a movable wall or diaphragm 12 covering the opening 19. Clamping the edges of this diaphragm is a housing 54 (see also Fig. 2) that defines the chamber 11 illustrated in Fig. 5. Within this chamber 11 is accommodated the electromagnet 10 and armature 14 pivoted by the aid of a knife edge upon a pole-piece 55 of the electromagnet. The armature 14 has a travel between the open end of the jet 15 and an opposed jet 56 which is connected to the vent 17 (Fig. 5). Both jets 15 and 56 are adjustably mounted within the wall of housing 54 as described hereinafter.

Armature 14 is urged resiliently to the unattracted position by a compression spring 100 mounted on an adjusting screw 101.

The diaphragm 35 of the regulator valve, together with the cover 36, defines a chamber 57 which in the usual regulator valve structure is vented to atmosphere. Such a venting is disadvantageous in the event of rupture of the diaphragm 35. Under such conditions, gaseous fuel can escape to the circumambient atmosphere with consequent danger of explosion.

In the present instance, the chamber 57 is vented into the chamber 11. This is accomplished by the aid of a vent 58 leading to a port 59 (Fig. 1). This port 59 is partially defined by a tube 60 which serves as well for positioning the cover member 36 with respect to the opening 20. This tube 60 discharges into a port 61 having an opening 62 in the chamber 11. This port 61 is partly defined by a hollow tube 63 similar to tube 60 between the housing 54 and the casing 18.

As shown most clearly in Figs. 1, 2 and 3, a port is formed from the space above the valve seat member 29 into the chamber 11. This port is partly defined by the hollow tube 64 (see also Fig. 4). This hollow tube connects with a port that discharges into a chamber 65 in which is accommodated a filter structure for removing foreign matter that may be carried by the gaseous fuel. This filter structure includes filter material 66 enclosed in a metal cartridge 67 open at both ends and having legs 68 bottoming in the chamber or recess 65. Accordingly, the gaseous fuel proceeds upwardly through tube 64, as viewed in Fig. 1, toward the right, and past the exterior of cartridge 67, then between the legs 68 toward the left through the filtering material 66. Thence the filtered material passes through passages formed in a cover member 69, sealing the chamber 65 as by the aid of the gasket 70. This gasket 70 is apertured to permit free passage of the gas at the outlet or left-hand end of the filtering material 66, into the space 72 in cover 69.

A ring 71 is disposed adjacent the upper end of the space 72. The space 72 has an opening 73 (Fig. 3) permitting the passage of the filtered fuel into the port 74. Thence the fuel passes to a space 75 into communication with the interior of the jet member 15.

Figure 4:
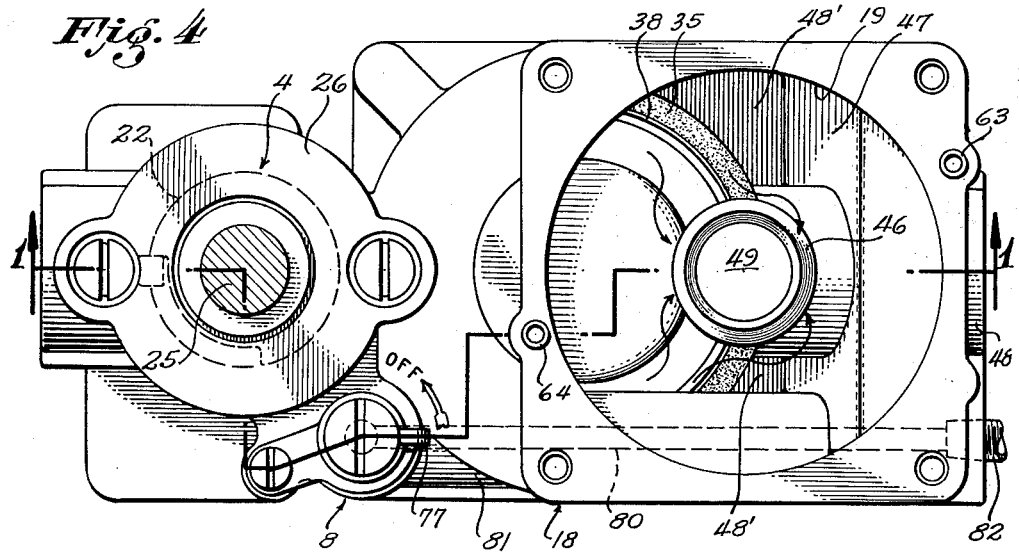
Fig. 4 is a sectional view, taken along a plane corresponding to line 4—4 of Fig. 1.

Gas for the pilot burner is supplied through plug valve 8 having a plug closure 76 (Fig. 1). This plug closure has a small manually operable handle 77 (Figs. 1 and 4), by the aid of which it may be readily manipulated. A tapered seat 78 is formed in the body member 18 for the plug closure. The plug is provided with a central port 79 adapted to be placed into communication with a passage 80 formed in the body member 18 and leading to the pilot burner 2. A boss 81, shown in the right-hand portion of Fig. 1 and also in Fig. 4, provides space for the port or passage 80, which may be connected in an appropriate manner to the conduit 82 leading to the pilot burner 2.

Fuel is supplied to the valve 8 via another port 83 which communicates with the bottom of a chamber 84 formed in the body 18. Gas can flow into the bottom of this chamber through a filter 85 and a port 86 leading into the intake opening of the valve structure. A cover 87 holds the filter structure in place. An O-ring 88 serves to confine the path of the fuel through the filter material 85 instead of around the filter casing.

In order to adjust the outlet passage through pilot plug 76, a hollow screw 90 is adjustably threaded in the plug to control the opening of the exposed left-hand end of port 80. A screw 91 serves to cover the upper end of the threaded aperture that accommodates screw 90.

In the event of rupture of the diaphragm 35, fuel would pass via ports 58, 60 and 61 to the interior of the chamber 11 and thence outwardly through vent pipe 17 to be consumed by the pilot flame. In the event the pilot flame is inactive, this vent is closed, as shown in Fig. 5. In this way there is no way in which unconsumed gas can reach the external atmosphere without being ignited by the pilot flame. When the main valve closure 13 is urged by the pressure of the gas applied through jet 15, to close the valve, the gas pressures on both sides of the regulator diaphragm 35 are equal. This is true because inlet pressure is applied above the diaphragm via port 28 from plug valve closure 23; and the same inlet pressure is applied below the diaphragm from chamber 11 via ports or passages 62, 61, 60 and 58. Accordingly, while the valve 6 is in the closed position, spring 34 can urge the closure 31 to the fully open position. Therefore, when the valve 6 opens no delay is encountered in the supply of gas to the conduit 7 (Fig. 5).

The inventor claims:

1. In a system of the character described: a valve body structure providing a first and a second valve passage in tandem; means providing a supply of gaseous fuel under pressure to the first passage; a first valve closure for the first passage; a movable diaphragm attached to the first closure, and having one side exposed to the fluid pressure past the first passage; means forming, with said diaphragm, a first chamber on the other side of said diaphragm; means resiliently urging said diaphragm in a direction to move the first valve closure toward open position, whereby the position of the first closure is regulated with respect to said first passage; a second valve closure for the second passage; a movable wall operable by the fluid pressure past the first passage for urging said second valve closure to open position; said valve body structure forming, with one side of the wall, a space in which the second passage is exposed; means forming a second fluid pressure chamber, operative on the other side of said wall, the pressure in said chamber urging the wall toward valve-closing position; means controlling the flow of fluid ahead of said passages into said second chamber; conduit means leading from the first chamber to said second chamber; a fuel burner; and conduit means from the second chamber to the fuel burner for optionally relieving the pressure in said second chamber to open the second valve closure.

2. In a system of the character described; a valve body structure providing a first and a second valve passage in tandem; means providing a supply of gaseous fuel under pressure to the first passage; a first valve closure for the first passage; a movable diaphragm attached to the first closure, and having one side exposed to the fluid pressure past the first passage; means forming, with said diaphragm, a first chamber on the other side of said diaphragm; means resiliently urging said diaphragm in a direction to move the first valve closure toward open position, whereby the position of the first closure is regulated with respect to said first passage; a second valve closure for the second passage; a movable wall operable by the fluid pressure past the first passage for urging said second valve closure to open position; said valve body structure forming, with one side of the wall, a space in which the second passage is exposed; means forming a second fluid pressure chamber, operative on the other side of said wall, the pressure in said chamber urging the wall toward valve closing position; means controlling the flow of fluid ahead of said passages into said second chamber; conduit means leading from the first chamber to said second chamber; a pilot burner; conduit means from the second chamber to the pilot burner; and means responsive to the existence of a flame at the pilot burner for relieving the pressure in said second chamber via said conduit means.

References Cited in the file of this patent

UNITED STATES PATENTS

| | | |
|---|---|---|
| 2,055,853 | Schwartz | Sept. 29, 1936 |
| 2,251,964 | Stackhouse | Aug. 12, 1941 |
| 2,273,127 | McGoldrick et al. | Feb. 17, 1942 |
| 2,294,694 | Ray | Sept. 1, 1942 |
| 2,373,326 | Miller | Apr. 10, 1945 |
| 2,524,377 | Cunningham | Oct. 3, 1950 |
| 2,595,171 | Schaefer | Apr. 29, 1952 |
| 2,753,931 | Ray | July 10, 1956 |